J. A. GREEN.
SURFACE GAGE.
APPLICATION FILED NOV. 15, 1919.
1,361,848.
Patented Dec. 14, 1920.
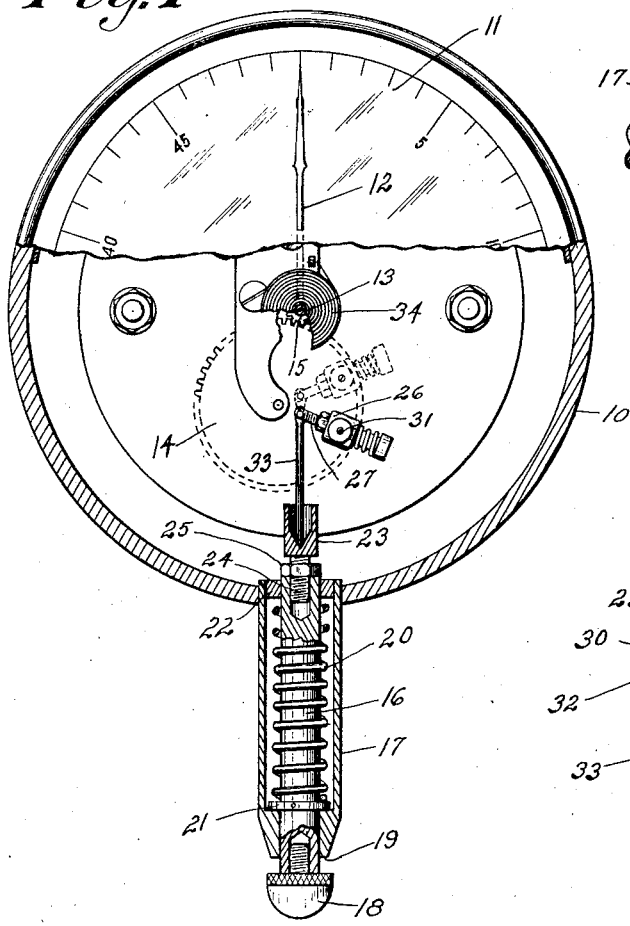
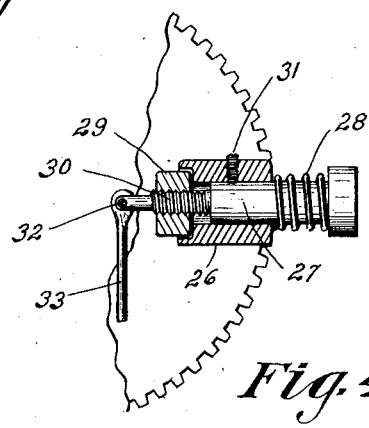
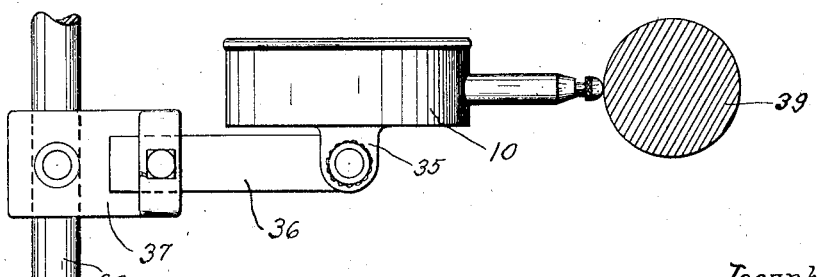
Inventor
Joseph A. Green.
By Howard E. Barlow
Attorney

UNITED STATES PATENT OFFICE.

JOSEPH A. GREEN, OF PROVIDENCE, RHODE ISLAND, ASSIGNOR TO FEDERAL SCREW CORPORATION, OF PROVIDENCE, RHODE ISLAND, A CORPORATION OF RHODE ISLAND.

SURFACE-GAGE.

1,361,848.  Specification of Letters Patent.  Patented Dec. 14, 1920.

Application filed November 15, 1919. Serial No. 338,152.

*To all whom it may concern:*

Be it known that I, JOSEPH A. GREEN, a citizen of the United States, and resident of Providence, in the county of Providence and State of Rhode Island, have invented certain new and useful Improvements in Surface-Gages, of which the following is a specification.

This invention relates to indicating surface gages; and has for its object to provide a dial type of gage which shall be simple and practical in construction and one which is provided with adjustable means for regulating the extent of movement of the pointer member over the face of the dial relative to the movement of its feeler member to indicate inaccuracies in the surface of the work.

With these and other objects in view, the invention consists of certain novel features of construction, as will be more fully described, and particularly pointed out in the appended claim.

In the accompanying drawings:

Figure 1— is a face view of my improved dial type of surface gage, showing the dial as partly broken away and a portion of the casing in section, to expose the working parts of the device.

Fig. 2— is a side elevation showing the gage as adjustably mounted on a standard in position to act upon the work.

Fig. 3— is a detail showing a fixture mounted on the stem-piece of the gage casing arranged to operate on the work at right angles to the movement of the feeler proper.

Fig. 4— is an enlarged view showing a portion of the motion-imparting gear with a post mounted thereon in section and the movement-regulating adjustable stud mounted in said post.

With reference to the drawing, 10 designates the casing in which the operating parts of the gage are mounted, the face of which casing is provided with a graduated dial 11.

A pointer member 12 is mounted on a shaft 13 to revolve over the face of this dial, which shaft receives its rotary motion from a pinion 15 mounted on the end thereof, which is actuated through a large gear 14. The feeler member 16 which imparts motion to the pointer through these gears, is mounted to reciprocate in a hollow stem-piece 17 extending from the casing, the outer end of this feeler being provided with a head 18 which is larger than the feeler rod and is set just the right distance from the end 19 of the stem-piece so that when pressed inwardly thereagainst, the pointer will make a single revolution over the dial.

This feeler-rod is normally held in extended position by spring 20 acting on a collar 21 pinned to the feeler rod, the upper end of this spring resting against the under side of the bearing block 22 through which the upper end of this rod extends.

In order to provide the necessary adjustment on the end of this rod, I have provided a cup member 23 having a stem 24 threaded into this rod, the same being locked in adjusted position by means of the nut 25.

On the large gear 14 I have secured a post 26 in which is adjustably mounted a member 27 provided with a spring 28 acting to move it outwardly, and also with a nut 29 which is adjustable on its threaded end 30 to limit the outward movement, a set screw 31 being provided in the post for binding this member in adjusted position.

Pivoted to the inner end of this adjustable member at 32 is a connector member 33, the lower end of which is pointed and rests against the rounding bottom of the cup-shaped member 23.

By employing a connector which simply bears against the surface of the cup 23 without being pivoted thereto the friction of its rocking action is reduced to the minimum and permits the free rotation of the member 23 in regulating the operating length of the feeler rod.

In operating my improved surface gage it is only necessary to position the feeler against the surface of the work to be tested. Any protuberances on the surface of the work as it passes along beneath this feeler will press the same inwardly and through the connector 33, adjustable member 27, gears 14 and 15, rotate the pointer 12 to indicate in thousandths of an inch or other unit of measure, the exact amount of the out-of-trueness of the work.

The cup member 23 may be adjusted to regulate the working length of the feeler rod by setting the pointer in the desired position relative to the dial.

A spiral spring 34 is arranged to act upon the shaft 13 to take up any wear or back lash of the gears 14 and 15 and also to hold the connector 33 bottomed in its cup member 23.

The member 27 mounted on a gear 14 is provided with a very delicate or micrometer endwise adjustment, so that it may be moved either in or out in its post 26 to position the upper end of the connector 32 either toward or from the center of this gear thus regulating the relative movement of the pointer so that the extent of endwise movement of the feeler shall be accurately indicated by the extent of movement of the pointer over the graduated face of the dial.

The mechanism is so arranged that a full inward motion of the feeler will cause its head 18 to bear against the end of the stempiece causing the pointer to make one complete revolution over the face of the dial.

In some cases I provide an ear member 35 on the bottom of the casing 10 to which a bar or other supporting member may be connected so as to be able to mount the device in a bracket 37 on a standard 38 or in any other desired holder and in position to act upon the work 39.

In some instances when it is desired to engage the bore or inner surface of a hole, a bracket 40 may be mounted on the stem 17 to support a right-angled lever member 41.

The device is practical and efficient in its operation and by its use the extent of the inaccuracies in the surface of the work may be readily determined.

The foregoing description is directed solely toward the construction illustrated, but I desire it to be understood that I reserve the privilege of resorting to all the mechanical changes to which the device is susceptible, the invention being defined and limited only by the terms of the appended claim.

I claim:

A surface gage comprising a graduated dial, a pointer adapted to be moved over said dial, an actuating member for said pointer, a feeler member, a post mounted on said actuating member, a bearing member adjustably mounted in said post, and a connector between said bearing member and feeler whereby the adjustment of said bearing member regulates the movement of said pointer relative to that of said feeler.

In testimony whereof I affix my signature.

JOSEPH A. GREEN.